United States Patent Office 2,891,974
Patented June 23, 1959

2,891,974
SUBSTITUTED 2,5-ANDROSTADIENES

Percy L. Julian, Oak Park, and Helen C. Printy, Chicago, Ill., assignors to The Julian Laboratories, Inc., Franklin Park, Ill., a corporation of Illinois No Drawing. Application March 13, 1958
Serial No. 721,101

12 Claims. (Cl. 260—397.4)

This invention relates to the preparation of a new series of anabolic steroids. More particularly, this invention relates to substituted 2,5-androstadienes, especially 17β-hydroxy-3-acyloxy-2,5-androstadien-4-one derivatives, and to the processes for making them.

The compounds of this invention have growth stimulating or tissue building activity (anabolic) with a minimum of virilizing (androgenic) or feminizing (estrogenic) activity. These 2,5-androstadienes, therefore, have a particularly favorable anabolic/androgenic ratio when compared to the standard drug in this field, testosterone. An additional feature of this invention is the preparation of these 2,5-androstadienes from easily obtainable starting materials.

The anabolic steroids of this invention are represented by the following general formula:

Formula I

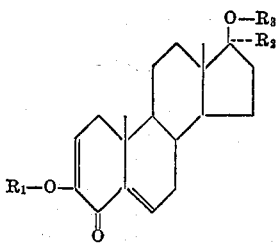

when:

$R_1$ represents an acyl moiety, for instance, formyl, a lower alkanoyl of from 2 to 6 carbons, benzoyl or hexahydrobenzoyl;

$R_2$ represents a hydrogen or an alkyl of 1 to 3 carbons; and $R_3$ represents a hydrogen or an acyl moiety, for instance, a lower alkanoyl of from 2 to 6 carbons such as acetyl, benzoyl or hexahydrobenzoyl.

Preferred compounds are represented by Formula I when $R_1$ represents acetyl or formyl, $R_2$ represents a hydrogen or α-methyl and $R_3$ represents a hydrogen or acetyl.

In practice, $R_1$ and $R_3$ may represent any acyl derivatives which possess activity as such or upon hydrolysis to the active hydroxylated compound in vivo. Illustrative of such acyl derivatives are oleate, palmitate, isobutyrate, stearate, benzoate, hemiphthalate, nicotinate, β-naphthoate, glycolate, cyclopentylpropionate, phenylacetate, hemimaleate and hemisuccinate. Of course the acyl moiety must be one which is derived from a nontoxic, stable and pharmaceutically acceptable acid.

The compounds of this invention are prepared by shifting the 3-keto-Δ⁴ unsaturated system of the corresponding testosterone derivative of the novel 4-keto-Δ⁵ system of Formula I. For example, the testosterone derivative is dibrominated at the 2 and 6 positions with two moles of bromine in inert solvent such as ether, methylene chloride or acetic acid at ice bath temperature, from about —5 to 10° C., usually with a trace of hydrogen bromide. The resulting 2,6-dibrominated testosterone then serves as starting material in the novel process which also is an object of this invention:

Formula II

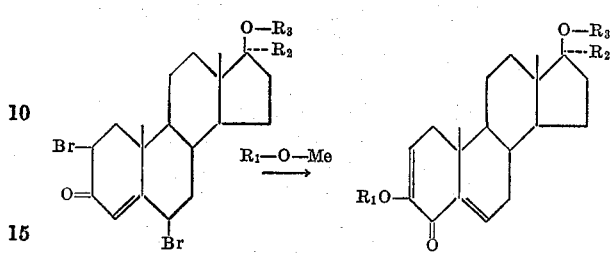

The dibromo derivative of Formula II in which $R_1$, $R_2$ and $R_3$ are as previously described, is purified or used as a crude mixture isolated from the bromination reaction.

The rearrangement of the unsaturated system is accomplished by reacting the brominated derivative with an excess of an alkaline salt of a lower aliphatic acid in a low boiling solvent in which the ingredients are at least partially soluble. The acid salt is preferably an alkali metal salt, advantageously sodium or potassium, of a lower aliphatic acid of from 1 to 8 carbons. In practice, a wide range of acid salts may be used, for instance, those with benzoate, hexahydrobenzoate, oleate or palmitate anions or those with lithium, calcium or magnesium cations.

As a convenience, a large excess of the metal salt ingredient is used, such as 1 to 5 times by weight of the dibromo derivative. The metal salt can be used in as little as two molar equivalents but advantageous results are obtained by using a large excess of the acid salt. The medium for the reaction is usually a low boiling solvent, in which the reactants are partially soluble, such as low boiling alcohols, ketones, chlorinated hydrocarbons or mixtures thereof. Exemplary of the solvents used are those boiling below about 120° C., such as methyl ethyl ketone, methanol, propanol, isobutanol, isopropanol, butanol, methylene chloride or mixtures thereof. Preferred are anhydrous ethanol, acetone and methyl ethyl ketone.

The reaction is run advantageously at the boiling point of the solvent employed. The temperature is not, however, allowed to go above the thermal decomposition point of the dibromo starting material and may be run at room temperature, i.e. 25° C. The reaction is advantageously run as a slurry with stirring at the boiling point of the solvent. The time for substantially complete rearrangement varies with the reaction conditions as well as with the structures of the dibromo intermediates but is normally from about 1 to about 18 hours at reflux temperature.

The novel compounds of this invention are isolated by concentrating the reaction mixture, dissolving the metal salts by washing with water and extracting into a water-immiscible solvent, such as ether or methylene chloride. The organic extracts are washed with water, dried and concentrated to give the desired product.

The rearrangement is preferably run on the 17-acyl derivatives with retention of the 17-acyl group, however, the 17-ol analogue is rearranged with equally good yields and may be 17-acylated by conventional reactions thereafter.

The following examples will serve to illustrate the preparation of the novel compounds as well as variations of the processes of this invention. The scope of this invention is not to be limited by these examples since it will be obvious to one skilled in the art that these ex-

Example 1

A solution of 3.3 g. (0.01 mole) of testosterone acetate in 110 ml. of anhydrous ether is cooled in an ice bath to 0–2° C. Two drops of 30% HBr in acetic acid are added, followed by a solution of 3.2 g. (0.02 mole) of bromine in 25 ml. of acetic acid, added over a seven minute period. The colorless brominated solution is kept at 0–2° C. for an additional ten minutes, then is concentrated in vacuo with gentle warming to a volume of 20 ml. The voluminous white crystalline precipitate, which is obtained, is filtered, washed with cold ethanol, and dried at room temperature. A first crop of 2,6-dibromotestosterone acetate, M.P. 170–172° C. is obtained.

A suspension of 1.0 g. of the dibromide and 4.0 g. of dry potassium acetate in 40 ml. of distilled acetone is stirred and refluxed for one hour. The reaction mixture is concentrated to a thick slush, water added to dissolve the potassium salts, and the organic material extracted with methylene chloride. The methylene chloride is washed with water and concentrated to a solid, halogen-free crystalline mass. The residue crystallized from ether in glistening prisms gives 3,17β-diacetoxy-2,5-androstadien-4-one, M.P. 173–174° C., $[\alpha]_D^{22} -11.9°$ (ethanol).

Example 2

One gram of 2,6-dibromotestosterone acetate (Example 1) is stirred and refluxed with 4.0 g. of fused potassium acetate and 25 ml. of anhydrous ethanol for four hours. Concentration to a slush, addition of water and filtration of the insoluble residue gives 3,17β-diacetoxy-2,5-androstadien-4-one, M.P. 169–173° C.

Example 3

A solution of 3.3 g. of testosterone acetate in 33 ml. of methylene chloride is brominated at 10° C. with 3.2 g. of bromine in 20 ml. of methylene chloride. The brominated solution is concentrated in vacuo with gentle heating, and the total residue refluxed with 15.0 g. of sodium acetate in 150 ml. of acetone for 12 hours. Working up as described in Example 1, the reaction mixture gives 3,17β-diacetoxy-2,5-androstadien-4-one.

Example 4

Testosterone (2.88 g., 0.01 mole) is dissolved in 200 ml. of anhydrous ether and brominated with 3.2 g. (0.02 mole) of bromine in 20 ml. of acetic acid. The ethereal bromination solution is washed with 5% sodium bicarbonate solution to remove acids, dried over sodium sulfate, and concentrated in vacuo to dryness. The residue is stirred and refluxed for 15 hours with 15 g. of potassium acetate in 150 ml. of methyl ethyl ketone. The reaction is worked up as in Example 1 to give 3-acetoxy-17β-hydroxy-2,5-androstadien-4-one, M.P. 128–134° C.

A solution of 500 mg. of this product in 10 ml. of pyridine is reacted with 250 mg. of benzoyl chloride. Quenching in water and extracting with ether gives 3-acetoxy-17β-benzoyloxy-2,5-androstadien-4-one.

Example 5

A mixture of 9.2 g. of 2,6-dibromotestosterone acetate, 35 g. of potassium formate and 350 ml. of acetone is stirred and refluxed for 15 hours. The reaction is worked up as described in Example 1, to give 3-formoxy-17β-acetoxy-2,5-androstadien-4-one, M.P. 195–205° C.

Example 6

A solution of 3.46 g. of 17α-methyltestosterone acetate in 35 ml. of methylene chloride is converted to the 2,6-dibromide by treatment with 3.2 g. of bromine in 20 ml. of methylene chloride. The methylene chloride solution is washed with 5% sodium bicarbonate solution to remove acid and concentrated to dryness. The total brominated product is refluxed for three hours with 12.0 g. of potassium acetate in 120 ml. of acetone. The reaction mixture is worked up as described in Example 1 to give a residue which yields, upon crystallization from acetone, 3,17β-diacetoxy-17α-methyl - 2,5 - androstadien - 4 - one, M.P. 170–176° C.

Example 7

Fifteen grams of 2,6-dibromo-17α-methyltestosterone is stirred and refluxed for 15 hours with 60.0 g. of fused potassium acetate and 150 ml. of acetone. The reaction is worked up as described in Example 2. Crystallization of the product from acetone gives 3-acetoxy-17β-hydroxy-17α-methyl-2,5-androstadien-4 - one, M.P. 190–194° C.

Example 8

A solution of 5.6 g. of testosterone stearate in 50 ml. of methylene chloride is converted to the dibromo derivative with 1.6 g. of bromine in 25 ml. of methylene chloride. After reaction at reflux with 10.0 g. of potassium acetate in 150 ml. of acetone-ethanol mixture for five hours as in Example 6, a solid product 3-acetoxy-17β-stearoyloxy-2,5-androstadien-4-one, is obtained.

Example 9

A solution of 3.6 g. of 17α-ethyltestosterone acetate in 45 ml. of methylene chloride is reacted with 1.6 g. of bromine. The resulting dibromo derivative is purified and reacted with 12.0 g. of sodium acetate in 150 ml. of acetone at reflux for two hours. The reaction mixture is worked up as in Example 1 to give 17α-ethyl-3,17β-diacetoxy-2,5-androstadien-4-one.

Example 10

A solution of 3.9 g. of testosterone isocaproate in 75 ml. of methylene chloride is reacted with 1.6 g. of bromine in 25 ml. of methylene chloride. The dibromo derivative is then heated at reflux in 75 ml. of methyl ethyl ketone with 10.0 g. of sodium isocaproate for three hours. After working up the reaction mixture as in Example 1, the product, 3,17β-di-isocaproyloxy-2,5-androstadien-4-one, is obtained.

Example 11

A suspension of 1.0 g. of 2,6-dibromotestosterone acetate and 5.0 g. of sodium benzoate in 50 ml. of acetone is heated at reflux with stirring for two hours. The reaction mixture is quenched in water and worked up as in Example 1, to give 17β-acetoxy-3-benzoyloxy-2,5-androstadien-4-one.

What is claimed is:
1. A chemical compound having the following formula:

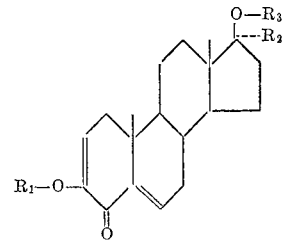

in which $R_1$ is acyl derived from a nontoxic, stable and pharmaceutically acceptable acid; $R_2$ is a member selected from the group consisting of hydrogen and lower alkyl; and $R_3$ is a member selected from the group consisting of hydrogen and acyl derived from a nontoxic, stable and pharmaceutically acceptable acid.

2. The method of forming compounds having the following formula:

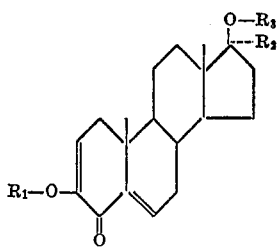

in which $R_1$ is acyl derived from a nontoxic, stable and pharmaceutically acceptable acid; $R_2$ is a member selected from the group consisting of hydrogen and lower alkyl; and $R_3$ is a member selected from the group consisting of hydrogen and acyl derived from a nontoxic, stable and pharmaceutically acceptable acid, which comprises reacting with at least two molar equivalents of the alkali metal salt of a carboxylic acid in a solvent of boiling point less than about 120° C. in which the reactants have substantial solubility at from about 25° C. to about 120° C. a compound having the following formula:

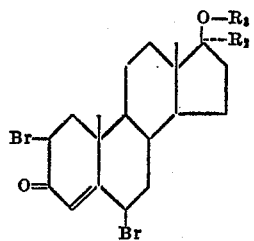

in which $R_2$ is a member selected from the group consisting of hydrogen and lower alkyl and $R_3$ is a member selected from the group consisting of hydrogen and acyl derived from a nontoxic, stable and pharmaceutically acceptable acid.

3. The method of claim 2 characterized in that the reaction is run at the boiling point of the solvent.

4. The method of claim 2 characterized in that the carboxylic acid is a lower aliphatic acid of from 1 to 8 carbons.

5. The method of claim 2 characterized in that a large excess of the alkali metal salt reactant is used.

6. A chemical compound having the following formula:

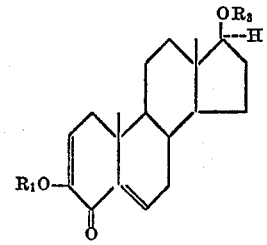

in which $R_1$ and $R_3$ are lower alkanoyl moieties of from 2 to 6 carbons.

7. A chemical compound having the following formula:

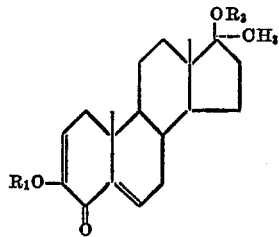

in which $R_1$ and $R_3$ are lower alkanoyl moieties of from 2 to 6 carbons.

8. 3,17β-diacetoxy-2,5-androstadien-4-one.
9. 3-formoxy-17β-acetoxy-2,5-androstadien-4-one.
10. 3,17β-diacetoxy-17α-methyl-2,5-androstadien-4-one.
11. 17α-ethyl-3,17β-diacetoxy-2,5-androstadien-4-one.
12. 3-acetoxy-17β-hydroxy-2,5-androstadien-4-one.

No references cited.